(12) United States Patent
Lee et al.

(10) Patent No.: US 10,008,734 B2
(45) Date of Patent: Jun. 26, 2018

(54) FABRICATING APPARATUS AND METHOD FOR SECONDARY BATTERY

(71) Applicant: SAMSUNG SDI CO., LTD., Yongin-si, Gyeonggi-do (KR)

(72) Inventors: Seunghwan Lee, Yongin-si (KR); Gibong Cho, Yongin-si (KR); Dongwoo Kim, Yongin-si (KR); Soonhak Hwang, Yongin-si (KR); Jinuk Hong, Yongin-si (KR); Kyuho Kim, Yongin-si (KR); Kyungtaek Choi, Yongin-si (KR); Sangjin Maeng, Yongin-si (KR); Jungki Min, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 544 days.

(21) Appl. No.: 14/791,134

(22) Filed: Jul. 2, 2015

(65) Prior Publication Data
US 2016/0036086 A1 Feb. 4, 2016

(30) Foreign Application Priority Data

Aug. 4, 2014 (KR) .......................... 10-2014-0099795

(51) Int. Cl.
*H01M 10/00* (2006.01)
*H01M 10/04* (2006.01)
*B65H 23/18* (2006.01)

(52) U.S. Cl.
CPC .... *H01M 10/0409* (2013.01); *B65H 23/1806* (2013.01); *B65H 2511/112* (2013.01);
(Continued)

(58) Field of Classification Search
CPC .......... B65H 2515/31; B65H 2511/112; B65H 2220/03; B65H 2553/212; B65H 2557/242; H01M 10/0409; H01M 2220/30
See application file for complete search history.

(56) References Cited

U.S. PATENT DOCUMENTS

| 3,839,088 A * | 10/1974 | Hug | ................ | H01M 10/0409 |
| | | | | 242/444.1 |
| 2003/0226928 A1* | 12/2003 | McNeil | ................ | B65H 23/198 |
| | | | | 242/413.2 |

(Continued)

FOREIGN PATENT DOCUMENTS

| JP | 08-282893 A | 10/1996 |
| JP | 10-310299 A | 11/1998 |

(Continued)

OTHER PUBLICATIONS

English machine translation of Japanese Publication No. JP 08-282893 A, dated Oct. 29, 1996, 12 pages.
(Continued)

*Primary Examiner* — Emmanuel M Marcelo
(74) *Attorney, Agent, or Firm* — Lewis Roca Rothgerber Christie LLP (57) ABSTRACT

Provided is a fabricating apparatus for a secondary battery, the fabricating apparatus including: a base material supplier configured to supply a base material; a winder configured to wind the base material through a mandrel; and a controller configured to control a base material supply amount of the base material supplier and a mandrel rotation amount of the winder, wherein the controller is further configured to store a profile of the base material supply amount with respect to the mandrel rotation amount, and to synchronously control the base material supply amount and the mandrel rotation amount based on the profile.

16 Claims, 6 Drawing Sheets

(52) U.S. Cl.
  CPC ...... *B65H 2513/11* (2013.01); *B65H 2515/31* (2013.01); *B65H 2553/212* (2013.01); *B65H 2557/242* (2013.01); *B65H 2801/72* (2013.01); *H01M 2220/30* (2013.01)

(56) References Cited

U.S. PATENT DOCUMENTS

| | | | |
|---|---|---|---|
| 2011/0146064 A1* | 6/2011 | Feaver | H01M 2/1673 |
| | | | 29/623.2 |
| 2014/0117141 A1* | 5/2014 | Kim | H01M 10/0409 |
| | | | 242/439.4 |

FOREIGN PATENT DOCUMENTS

| | | |
|---|---|---|
| JP | 2003-033064 A | 1/2003 |
| KR | 10-2012-0057438 A | 6/2012 |

OTHER PUBLICATIONS

English machine translation of Japanese Publication No. JP 10-310299 A, dated Nov. 24, 1998, 13 pages.

English machine translation of Japanese Publication No. JP 2003-033064 A, dated Jan. 31, 2003, 17 pages.

\* cited by examiner

FABRICATING APPARATUS AND METHOD FOR SECONDARY BATTERY

CROSS-REFERENCE TO RELATED APPLICATION

This application claims priority to and the benefit of Korean Patent Application No. 10-2014-0099795 filed on Aug. 4, 2014 in the Korean Intellectual Property Office, the content of which in its entirety are herein incorporated by reference.

BACKGROUND

1. Field

Aspects of embodiments of the present invention relate to a fabricating apparatus and method for a secondary battery.

2. Description of the Related Art

Recently, use of portable devices, such as a mobile phone, a personal digital assistant (PDA), a net-book, or a notebook computer, are gradually increasing. The portable devices are supplied with power from rechargeable secondary batteries according to use characteristics.

A secondary battery generally includes an electrode assembly including a positive electrode plate, a separator, and a negative electrode plate that are stacked and wound.

To this end, winding is performed while a base material for forming each electrode plate is unwound from a spool around which the base material is wound.

SUMMARY

During winding, it is desirable to maintain a tension of the base material at a constant or substantially constant level. If the tension is not maintained at a constant or substantially constant level during winding, deformation of the base material may occur within the electrode assembly. Therefore, it is desirable to develop a technique for maintaining the tension of the base material at a constant or substantially constant level, while supplying the base material.

Aspects of embodiments of the present invention provide a fabricating apparatus and method for a secondary battery, which can reduce failures during winding of an electrode assembly.

The above and other aspects and features of the present invention will be described in or be apparent from the following description of the example embodiments.

According to an embodiment of the present invention, there is provided a fabricating apparatus for a secondary battery, the fabricating apparatus including: a base material supplier configured to supply a base material; a winder configured to wind the base material through a mandrel; and a controller configured to control a base material supply amount of the base material supplier and a mandrel rotation amount of the winder, wherein the controller is further configured to store a profile of the base material supply amount with respect to the mandrel rotation amount, and to synchronously control the base material supply amount and the mandrel rotation amount based on the profile.

The profile may include the base material supply amount with a circumference variation corresponding to the mandrel rotation amount.

The fabricating apparatus may further include a tension measurer configured to measure a tension of the base material between the base material supplier and the winder.

The tension measurer may include a dancer system, a load cell, or a combination thereof.

The fabricating apparatus may further include a base material supply amount measurer configured to measure the base material supply amount between the base material supplier and the winder.

The base material supply amount measurer may include an encoder.

The controller may be configured to control the base material supply amount corresponding to the mandrel rotation amount to control the tension of the base material.

When the secondary battery includes a cylindrical battery, the profile may include a base material unit supply amount that gradually increases per turn of the mandrel.

When the secondary battery includes a rectangular battery, the profile may include a base material unit supply amount appearing as two parabolas per turn of the mandrel.

According to another embodiment of the present invention, there is provided a fabricating method for a secondary battery including an electrode assembly formed by winding a supplied base material, the method including: acquiring a profile of a base material supply amount of a base material supplier for supplying the base material with respect to a mandrel rotation amount of a winder for winding the base material; and synchronously driving the mandrel and the base material supplier based on the profile.

The acquiring of the profile may include measuring the base material supply amount from the base material supplier as the mandrel is rotated.

The acquiring of the profile may include measuring the base material supply amount utilizing a base material supply amount measurer while continuously rotating the mandrel.

The acquiring of the profile may include measuring the base material supply amount by multiplying a roller diameter of the base material supplier with a rotation angle while rotating the mandrel.

The fabricating method may further include: calculating the base material supply amount with respect to the mandrel rotation amount at a point of time of the profile to control the tension of the base material at the point of time; and controlling the calculated base material supply amount.

When the secondary battery comprises a cylindrical battery, the profile may include a base material unit supply amount that gradually increases per turn of the mandrel.

When the secondary battery comprises a rectangular battery, the profile may include a base material unit supply amount appearing as two parabolas per turn of the mandrel.

As described above, in the fabricating apparatus and method for a secondary battery according to embodiments of the present invention, a profile indicating the relationship of the base material supply amount relative to the mandrel rotation amount of the winding unit is pre-stored, and the controller controls the mandrel and the base material supply unit at the same time, thereby immediately correcting the tension of the base material.

In addition, in the fabricating apparatus and method for a secondary battery according to embodiments of the present invention, when it is necessary or desirable to correct the tension of the base material, the controller finely controls the base material supply amount with respect to the current mandrel rotation amount based on the profile, thereby maintaining the tension of the base material at a constant or substantially constant level during winding.

BRIEF DESCRIPTION OF THE DRAWINGS

The above and other aspects and features of the present invention will become more apparent by describing in detail example embodiments thereof with reference to the attached drawings in which.

DETAILED DESCRIPTION

Hereinafter, examples of embodiments of the invention will be described in detail with reference to the accompanying drawings, such that they can be made and used by those skilled in the art.

Figure 1:
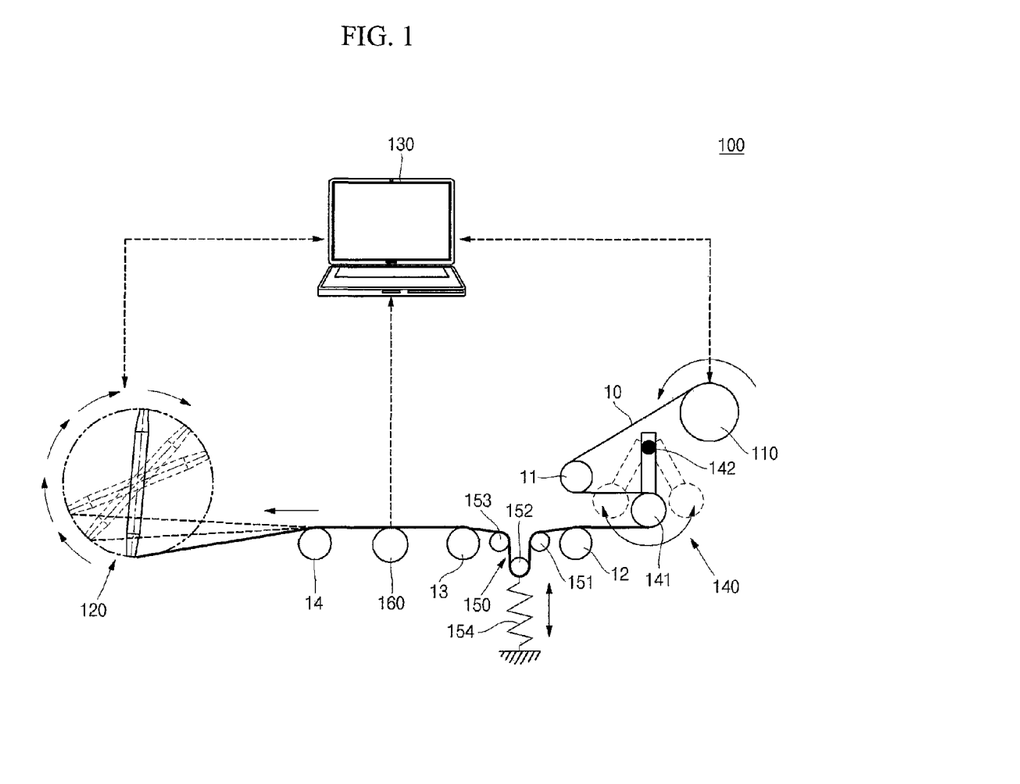
FIG. 1 is a block diagram of a fabricating apparatus for a secondary battery according to an embodiment of the present invention.

FIG. 1 is a block diagram of a fabricating apparatus for a secondary battery according to an embodiment of the present invention.

Referring to FIG. 1, the fabricating apparatus 100 for a secondary battery according to an embodiment of the present invention may include a base material supply unit 110 (e.g., a base material supplier) at an end of the fabricating apparatus 100 for supplying an electrode plate base material 10, a winding unit 120 (e.g., a winder) at another end of the fabricating apparatus 100 for winding the base material 10, a controller 130 for controlling the supplying and winding of the base material 10, a dancer system 140 and a load cell 150 (e.g., a tension measurer) for measuring a tension of the supplied base material 10, and a base material supply amount measuring unit 160 (e.g., a base material supply amount measurer) for measuring a supply amount of the base material 10.

The base material supply unit 110 may include a spool around which the electrode plate base material 10 is wound and/or a driving roller coupled (e.g., connected) to the spool. The base material supply unit 110 supplies the base material 10 by rotation, and accordingly, the base material 10 may be supplied at a constant or substantially constant speed (e.g., a predefined speed).

The winding unit 120 is at an opposite side of the base material supply unit 110, and winds the base material 10 supplied through a mandrel in a shape or configuration (e.g., a predetermined shape or configuration). For example, the winding unit 120 may wind the base material 10 in a cylindrical configuration for a cylindrical battery according to the shape of the mandrel, or in a flat or oval configuration for a rectangular battery. In addition, it is desirable for the winding unit 120 to wind the base material 10 with a constant tension during winding.

The controller 130 controls the base material supply unit 110 and the winding unit 120 concurrently (e.g., at the same time or simultaneously), so that the base material 10 wound around the winding unit 120 can be wound with a constant or substantially constant tension.

To this end, as will be described below, the controller 130 stores a profile corresponding to (e.g., indicating) the relationship between the mandrel rotation amount of the winding unit 120 and the base material supply amount of the base material supply unit 110. The controller 130 controls concurrently (e.g., at the same time or simultaneously) the mandrel rotation amount of the winding unit 120 and the base material supply amount of the base material supply unit 110 based on the profile. Therefore, even if the mandrel rotation amount is accelerated or decelerated at a high speed, since the base material supply amount of the base material supply unit 110 is also controlled without delay, the tension of the base material 10 is not changed. In addition, since the controlling is performed based on the pre-stored profile, a separate sensing operation is not required, thereby preventing or reducing noises and delays in time from occurring during sensing and signal transfer processes. Accordingly, in the fabricating apparatus 100 for a secondary battery according to an embodiment of the present invention, the electrode assembly can be wound without causing deformation in the external shape, by maintaining the base material 10 at a constant or substantially constant tension level.

In the fabricating apparatus 100 for a secondary battery according to an embodiment of the present invention, a tension measurer may include the dancer system 140 and the load cell 150 to measure the tension of the base material 10. However, the present invention is not limited thereto, and the tension measurer may include either the dancer system 140 or the load cell 150, or a combination of both the dancer system 140 and the load cell 150.

When the tension is applied to the base material 10 by changing a direction of the base material 10 roughly reversely through a first roller 11, the dancer system 140 receives the base material 10. The dancer system 140 is formed in the shape of a bar and may change the direction of the base material 10 roughly reversely through a roller 141 provided at a bottom end of the dancer system 140 to receive the base material 10. The bottom end of the dancer system 140 is rotatable in a left-and-right direction with a top end being (e.g., used as) a rotation axis. In addition, the bottom end of the dancer system 140 is rotated according to the tension of the base material 10 to allow a constant or substantially constant level of tension to be applied to the base material 10. In addition, the dancer system 140 includes a rotation angle sensor 142 provided at the top end of the dancer system 140 as the rotation axis, thereby measuring the tension of the base material 10 by measuring the rotation angle of the bottom end.

Figure 2:
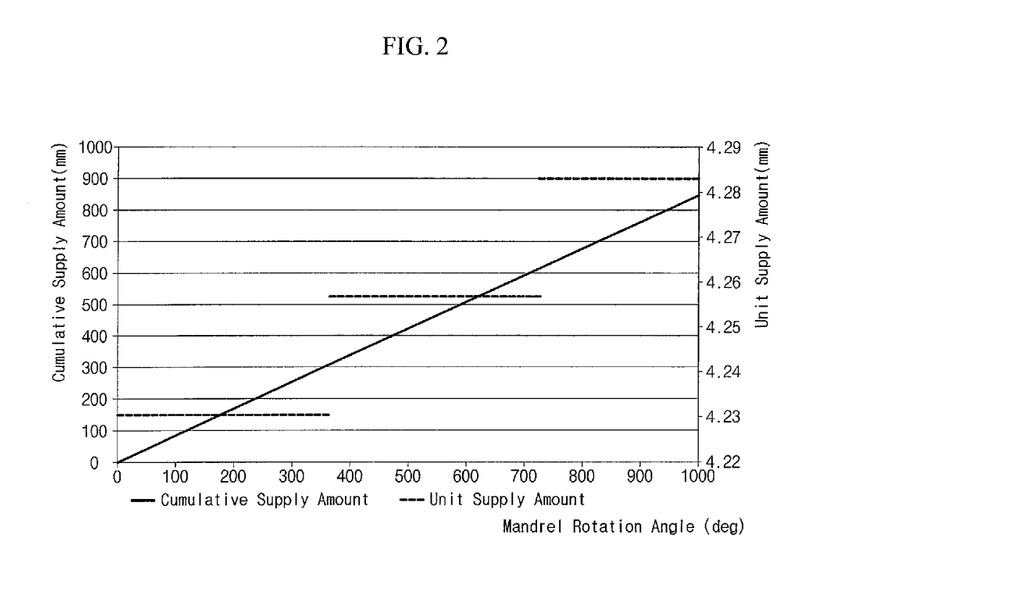
FIG. 2 is a graph illustrating profiles of mandrel rotation amounts and base material supply amounts when a secondary battery is a cylindrical battery according to an embodiment of the present invention.

The load cell 150 receives the base material 10 from the dancer system 140 through a second roller 12. In addition, as shown in FIG. 2, the load cell 150 may change the direction of the base material 10 through three rollers 151, 152, and 153. For example, if the front and rear rollers 151 and 153 are positioned to allow the base material 10 to pass thereon, and the central roller 152 is positioned to allow the base material 10 to pass thereunder, an elastic member 154 (e.g., a spring) may be formed under the central roller 152. Therefore, a force applied to the elastic member 154 varies according to the tension of the base material 10, so that the load cell 150 may measure the tension of the base material 10.

The base material supply amount measuring unit 160 receives the base material 10 from the load cell 150 through a third roller 13, and is positioned in front (e.g., immediately in front) of the winding unit 120. The base material supply amount measuring unit 160 may include an encoder. The base material supply amount measuring unit 160 may measure an amount of the supplied base material 10. At an initial setting stage of the fabricating apparatus 100 for a secondary battery according to an embodiment of the present invention, the base material supply amount measuring unit 160 is used to obtain profiles of the mandrel rotation amount and the base material supply amount.

In more detail, the base material supply amount measuring unit 160 measures a length of the base material 10 received from the base material supply unit 110 at a front (e.g., immediately in front) of the mandrel, while rotating the mandrel of the winding unit 120 at an angle (e.g., predetermined angle). In addition, the controller 130 stores the profiles produced from data of the mandrel rotation amount and the base material supply amount. In addition, as described above, the controller 130 controls concurrently (e.g., at the same time or simultaneously) the mandrel rotation amount of the winding unit 120 and the base material supply amount of the base material supply unit 110 based on the stored profiles, thereby winding the electrode assembly with a constant or substantially constant level of tension.

Hereinafter, profiles of the mandrel rotation amounts and the base material supply amounts in the fabricating method for a secondary battery according to an embodiment of the present invention will be described.

Figure 3:
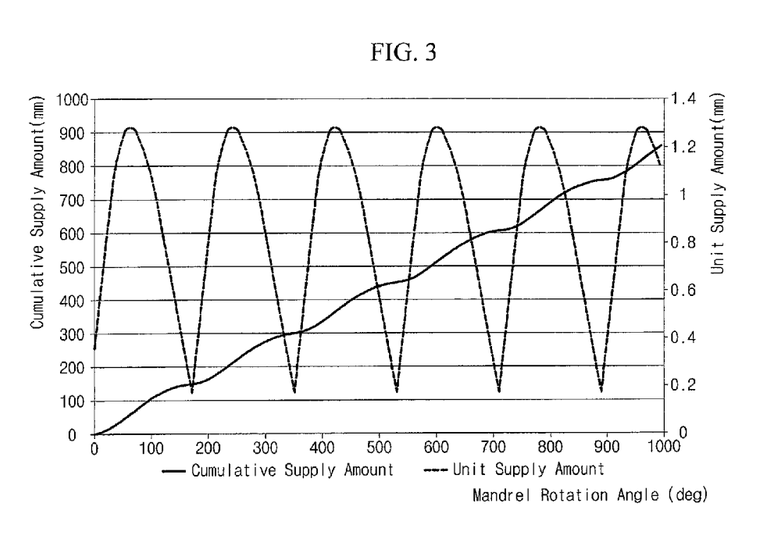
FIG. 3 is a graph illustrating profiles of mandrel rotation amounts and base material supply amounts when a secondary battery is a rectangular battery according to an embodiment of the present invention.

FIG. 2 illustrates profiles of the mandrel rotation amounts and the base material supply amounts when a secondary battery according to an embodiment of the present invention includes a cylindrical battery, and FIG. 3 illustrates profiles of the mandrel rotation amounts and the base material supply amounts when a secondary battery according to an embodiment of the present invention includes a rectangular battery.

Referring to FIG. 2, when a secondary battery according to an embodiment of the present invention includes a cylindrical battery, a unit supply amount (the y axis in the right of the graph) with respect to a mandrel rotation angle (the x axis of the graph) gradually increases on the basis of a multiple of 360 degrees as the rotation angle, because the mandrel is in the shape of a cylinder and a winding circumference per turn of the base material 10 gradually increases due to the thickness of the base material 10. In addition, a profile in which a cumulative supply amount (the y axis in the left of the graph) is roughly proportional to the mandrel rotation angle (the x axis of the graph) is generated. However, since the circumference gradually increases from the multiple of 360 degrees as the rotation angle in the cumulative supply amount, the profile of the cumulative supply amount is shaped to increase taking into consideration the mandrel rotation angle and the circumference increment. Since the thickness of the base material 10 is very small, the cumulative supply amount (the y axis in the left of the graph) is roughly linear.

Referring to FIG. 3, when a secondary battery according to an embodiment of the present invention includes a rectangular battery (or prismatic battery), the unit supply amount (the y axis in the right of the graph) with respect to the mandrel rotation angle (the x axis of the graph) varies, such that approximately two parabolas are generated per turn (ranging from 0 to 360 degrees in rotation angle). Since the mandrel is roughly flat, the length of the base material 10 that is wound varies as the mandrel rotates 0 to 360 degrees. The upper limit of the parabola corresponds to the center of a longer side of the mandrel, and the lower limit of the parabola corresponds to a shorter side of the mandrel. In addition, the cumulative supply amount (the y axis in the left of the graph) with respect to the mandrel rotation angle (the x axis of the graph), which is obtained by accumulating the unit supply amount (the y axis in the right of the graph) in the unit of one turn, gradually increases according to the rotation of the mandrel. In this case, due to the thickness of the base material 10, when the mandrel rotates, the base material supply amount is an amount taking into consideration an increment of the base material supply amount. However, since the thickness of the base material 10 is very small, the cumulative supply amount is roughly repeated in units of one turn of the mandrel.

Hereinafter, a fabricating method for a secondary battery according to an embodiment of the present invention will be described with reference to FIGS. 4 to 6.

Figure 4:
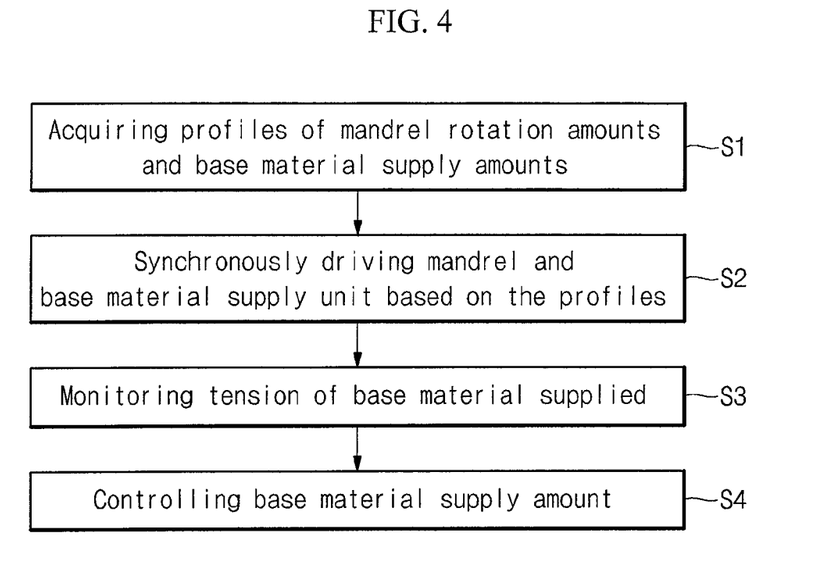
FIG. 4 is a flowchart illustrating a fabricating method for a secondary battery according to an embodiment of the present invention.
Figure 5:
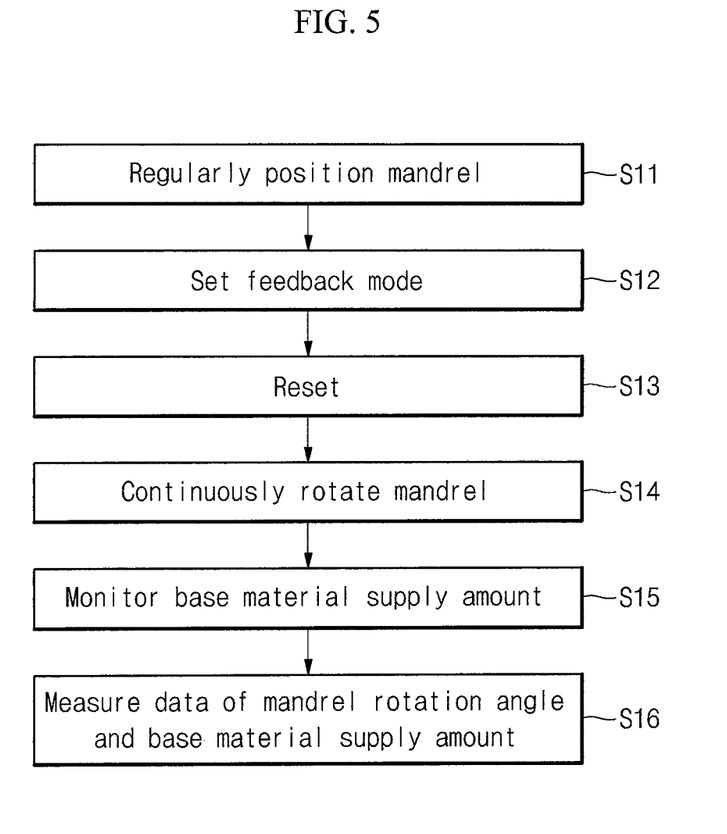
FIG. 5 is a flowchart illustrating an example method of acquiring profiles of mandrel rotation amounts and base material supply amounts shown in FIG. 4.
Figure 6:
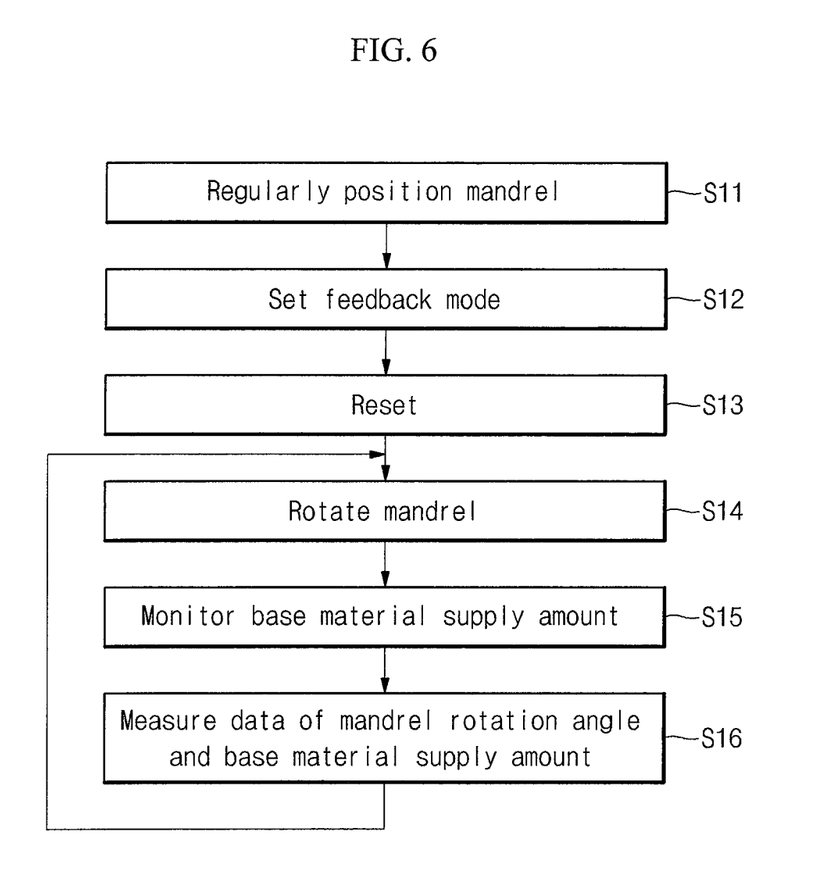
FIG. 6 is a flowchart illustrating another example method of acquiring profiles of mandrel rotation amounts and base material supply amounts shown in FIG. 4.

FIG. 4 is a flowchart illustrating a fabricating method for a secondary battery according to an embodiment of the present invention, FIG. 5 is a flowchart illustrating an example method of acquiring profiles of the mandrel rotation amounts and the base material supply amounts shown in FIG. 4, and FIG. 6 is a flowchart illustrating another example method of acquiring profiles of the mandrel rotation amounts and the base material supply amounts shown in FIG. 4.

Referring to FIG. 4, the fabricating method for a secondary battery according to an embodiment of the present invention may include acquiring profiles of the mandrel rotation amounts and the base material supply amounts (S1), synchronously driving a mandrel and a base material supply unit based on the profiles (S2), monitoring a tension of the supplied base material (S3), and controlling the base material supply amount (S4).

The acquiring of the profiles for the mandrel rotation amounts and the base material supply amounts (S1) includes acquiring the profiles obtained from data corresponding to the relationship between the mandrel rotation amount and the base material supply amount by measuring the base material supply amount by the base material supply amount measuring unit 160, while the controller 130 rotates the mandrel of the winding unit 120 at an angle (e.g., predetermined angle) in the fabricating apparatus 100 for a secondary battery according to an embodiment of the present invention.

In more detail, the acquiring of the profiles for the mandrel rotation amounts and the base material supply amounts (S1) may be performed by continuously measuring the mandrel rotation amounts and the base material supply amounts through the process shown in FIG. 5. In the process shown in FIG. 5, the mandrel of the winding unit 120 is regularly positioned (S11), and the dancer system 140 or the load cell 150 is set to a feedback mode (S12). In the feedback mode, the dancer system 140 and the load cell 150 may maintain the tension applied to the base material 10 at a constant or substantially constant level, and the rotation of the base material supply unit 110 may be controlled according to the variation in the base material unit supply amount in order to maintain a constant or substantially constant tension level.

In addition, data corresponding to the mandrel rotation angle of the winding unit 120 and the base material supply amount measuring unit 160 are reset for initialization (S13), and the mandrel is continuously rotated at a constant or substantially constant speed (S14).

In addition, the base material supply amount measuring unit 160 monitors a length of the supplied base material 10 from the front (e.g., immediately in front) of the winding unit 120 (S15), and the controller 130 finally measures data corresponding to the relationship between the base material supply amount and the mandrel rotation angle (S16), thereby creating the profile.

As shown in FIG. 6, the acquiring of the profiles of the mandrel rotation amounts and the base material supply amounts (S1) may include intermittently measuring the mandrel rotation amounts and the base material supply amounts.

First, the mandrel of the winding unit 120 is regularly positioned (S11), the dancer system 140 or the load cell 150 is set to a feedback mode (S12), and data corresponding to the relationship between the mandrel rotation amount of the winding unit 120 and the base material supply amount of the base material supply amount measuring unit 160 are reset for initialization (S13), which are the same or substantially the same with those in the continuous measuring of the mandrel rotation amounts and the base material supply amounts, as shown in FIG. 5.

However, in the intermittent measuring, the mandrel of the winding unit 120 is rotated by an angle (e.g., predetermined angle) to be stopped (S14), and a length of the supplied base material 10 is monitored (S15). The length of the base material 10 may be monitored by (e.g., using) the base material supply amount measuring unit 160. In some cases, the length of the base material 10 may be calculated by multiplying a roller diameter of the base material supply unit 110 with a rotation angle.

In addition, the controller 130 controls the base material supply amount measuring unit 160 to measure the data corresponding to the relationship between the mandrel rotation amount and the base material supply amount (S16), and the steps S14 to S16 are repeatedly performed, thereby acquiring a final profile.

In addition, as described above, the profile may be shaped as shown in FIG. 2 or 3, according to the kind of secondary battery fabricated (e.g., cylindrical or rectangular).

During the synchronous driving of the mandrel and the base material supply unit (S2), the controller 130 synchronously drives the mandrel of the winding unit 120 and the base material supply unit 110 based on the acquired profile. In the synchronous driving of the mandrel and the base material supply unit (S2), unlike in an existing feedback mode, since a time difference between a time of sensing the tension of the base material 10 and a time of controlling the base material supply amount is not necessarily taken into consideration, the synchronous driving of the mandrel and the base material supply unit 110 can be accurately achieved.

During the monitoring of the tension of the supplied base material 10 (S3), the controller 130 monitors the tension of the base material 10 through the tension measurer (e.g., the load cell 150) during the winding of the electrode assembly. Accordingly, the controller 130 may monitor whether or not the tension of the base material 10 is constant or substantially constant during the winding of the electrode assembly.

During the controlling of the base material supply amount (S4), in order to maintain the tension of the base material 10 at a constant or substantially constant level, the base material supply amount is controlled. If it is necessary or desirable to change the tension of the base material 10 during the winding, the controller 130 identifies a current mandrel angle of the winding unit 120, and controls (e.g., finely controls) a unit supply amount of the base material supply unit 110, corresponding to the current mandrel angle. For example, in order to increase the tension of the base material 10, the unit supply amount of the base material 10 is reduced, and in order to reduce the tension of the base material 10, the unit supply amount of the base material 10 is increased.

While the fabricating apparatus and method for a secondary battery according to the present invention have been particularly shown and described with reference to example embodiments herein, it will be understood by those of ordinary skill in the art that various changes in form and details may be made, without departing from the spirit and scope of the present invention as defined by the following claims and their equivalents. It is therefore desired that the present embodiments be considered in all respects as illustrative and not restrictive, with reference being made to the appended claims and their equivalents, rather than the foregoing description, to indicate the spirit and scope of the present invention.

What is claimed is:

1. A fabricating apparatus for a secondary battery, the fabricating apparatus comprising:
   a base material supplier configured to supply a base material;
   a winder configured to wind the base material through a mandrel; and
   a controller configured to control a base material supply amount of the base material supplier and a mandrel rotation amount of the winder,
   wherein the controller is further configured to store a profile of the base material supply amount with respect to the mandrel rotation amount, and to synchronously control the base material supply amount and the mandrel rotation amount based on the profile.

2. The fabricating apparatus of claim 1, wherein the profile comprises the base material supply amount with a circumference variation corresponding to the mandrel rotation amount.

3. The fabricating apparatus of claim 1, further comprising a tension measurer configured to measure a tension of the base material between the base material supplier and the winder.

4. The fabricating apparatus of claim 3, wherein the tension measurer comprises a dancer system, a load cell, or a combination thereof.

5. The fabricating apparatus of claim 1, further comprising a base material supply amount measurer configured to measure the base material supply amount between the base material supplier and the winder.

6. The fabricating apparatus of claim 5, wherein the base material supply amount measurer comprises an encoder.

7. The fabricating apparatus of claim 1, wherein the controller is configured to control the base material supply amount corresponding to the mandrel rotation amount to control the tension of the base material.

8. The fabricating apparatus of claim 1, wherein when the secondary battery comprises a cylindrical battery, the profile comprises a base material unit supply amount that gradually increases per turn of the mandrel.

9. The fabricating apparatus of claim 1, wherein when the secondary battery comprises a rectangular battery, the profile comprises a base material unit supply amount appearing as two parabolas per turn of the mandrel.

10. A fabricating method for a secondary battery comprising an electrode assembly formed by winding a supplied base material, the method comprising:
    acquiring a profile of a base material supply amount of a base material supplier for supplying the base material with respect to a mandrel rotation amount of a winder for winding the base material; and synchronously driving the mandrel and the base material supplier based on the profile.

11. The fabricating method of claim 10, wherein the acquiring of the profile comprises measuring the base material supply amount from the base material supplier as the mandrel is rotated.

12. The fabricating method of claim 11, wherein the acquiring of the profile comprises measuring the base material supply amount utilizing a base material supply amount measurer while continuously rotating the mandrel.

13. The fabricating method of claim 11, wherein the acquiring of the profile comprises measuring the base material supply amount by multiplying a roller diameter of the base material supplier with a rotation angle while rotating the mandrel.

14. The fabricating method of claim 11, further comprising:
   calculating the base material supply amount with respect to the mandrel rotation amount at a point of time of the profile to control the tension of the base material at the point of time; and
   controlling the calculated base material supply amount.

15. The fabricating method of claim 11, wherein when the secondary battery comprises a cylindrical battery, the profile comprises a base material unit supply amount that gradually increases per turn of the mandrel.

16. The fabricating method of claim 11, wherein when the secondary battery comprises a rectangular battery, the profile comprises a base material unit supply amount appearing as two parabolas per turn of the mandrel.

* * * * *